United States Patent [19]

Nied

[11] Patent Number: 5,793,010
[45] Date of Patent: Aug. 11, 1998

[54] ELECTROMAGNETIC FIELD ENHANCED BRAZING METHOD

[75] Inventor: Herman Arthur Nied, Ballston Lake, N.Y.

[73] Assignee: General Electric Company, Schenectady, N.Y.

[21] Appl. No.: 636,089

[22] Filed: Apr. 22, 1996

[51] Int. Cl.$^6$ .................................................. B23K 1/002
[52] U.S. Cl. ............................................. 219/85.22
[58] Field of Search ......................... 219/85.1, 85.14, 219/85.15, 85.16, 85.22

[56] References Cited

U.S. PATENT DOCUMENTS

| | | | |
|---|---|---|---|
| 4,443,678 | 4/1984 | Jacovides et al. | 219/10.41 |
| 5,113,052 | 5/1992 | Gabriel | 219/85.22 |
| 5,155,326 | 10/1992 | Whims et al. | 219/121.64 |
| 5,600,290 | 2/1997 | Anderson, II | 333/252 |

OTHER PUBLICATIONS

Lawson P. Harris, *Hydromagnetic Channel Flows*, iii–iv, 61–74 (1960).

A.G. Kulikovskiy and G.A. Lyubimov, *Magnetohydrodynamics*, iii–iv, 1–41 (1962).

Joining of Advanced Materials, by Robert W. Messler, Jr., Butterworth–Neine Man., p. 298, 1996.

"A Quasi–One–Dimensional Analysis of an Electromagnetic Pump Including End Effects", by W.F. Hughes et al., paper presented at Third Beer–Sheva International Seminar on Magnetohydrodynamic Flows and Turbulence, En–Gurion University of the Negev, Beer–Sheva, Israel, Mar. 23–27, 1981, pp. 287–312.

"Electromagnetic Stirring in the Coreless Induction Furnace", by D.J. Moore et al., Progress in Astronautics & Aeronautics, American Institute of Aeronautics and Astronautics, Inc., pp. 359–373, 1983.

*Primary Examiner*—Matthew V. Nguyen
*Attorney, Agent, or Firm*—Tyler Maddry; Noreen C. Johnson

[57] ABSTRACT

A brazing process is enhanced by the employment of an external electromagnetic field. In complex joints of large components, gravity and surface tension forces acting on the molten braze alloy are insufficient for completely filling the interfacial gap. An external electromagnetic field enhances molten braze flow into voids between the components.

8 Claims, 1 Drawing Sheet

ELECTROMAGNETIC FIELD ENHANCED BRAZING METHOD

BACKGROUND OF THE INVENTION

This invention relates to a brazing method, and more particularly, to a brazing method using an external electromagnetic field to enhance the method.

Current brazing methods or processes, which are used in industry, rely primarily on gravity and surface tension forces to distribute the molten brazing alloy for filling all interfacial gaps forming the joint during the bonding process. Even though precautions are taken to properly clean and fixture the components during brazing to provide the proper gap size, unbrazed regions and other defects can form at the interface due to interfacial flow resistance in the narrow gap; especially for complicated braze joint geometries. These defects and unbrazed regions that can form during brazing often appears to be the source of application failures by fatigue or lack of strength.

The reliance solely on gravity and surface tension forces acting on the braze alloy in the molten state are insufficient for completely filling the entire interfacial gap in certain brazed joint designs which is especially prevalent for large areas to be joined. Current brazing methods produce bonds for the simplest geometries and designs. However, there is an opportunity for a more controlable brazing method which can assure that the braze alloy in the liquid state would be forced to completely fill large areas, corners and fillets without forming voids during the brazing method before the cooldown.

It is apparent from the above that there exists a need in the art for an improved brazing method for completely filling the entire interfacial gap in brazed joints. This is particularly necessary for complicated braze joint geometries. It is a purpose of this invention to fulfill this and other needs in the art in a manner more apparent to the skilled artisan and given the following disclosure.

SUMMARY OF THE INVENTION

The above-mentioned needs are met by the present invention which relates to a novel brazing method employing an external electromagnetic field to enhance the method. More particularly, the present method comprises positioning together metallic components for forming a joint therebetween, providing a brazing alloy for the joint, heating the components to melt the brazing alloy, applying an electromagnetic field to enhance molten braze flow into the voids between the components, and cooling down the joined components.

Another embodiment of the present invention is a method of braze joining an article which comprises positioning together two dissimilar metallic components with complex inner surfaces thereby forming a first joint therebetween, providing a brazing alloy shim against the inner surfaces of the components, heating the components thereby melting the brazing alloy shim into a molten alloy braze, applying an electromagnetic field to the molten alloy brazen providing enhanced capillary flow, and cooling down the joined components thereby forming an article.

BRIEF DESCRIPTION OF THE DRAWINGS

The subject matter, which is regarded as the invention, is particularly pointed out and distinctly claimed in the concluding part of the specification. The invention, however, may be best understood by reference to the following description taken in conjunction with the accompanying drawing figure in which:

DETAILED DESCRIPTION OF THE INVENTION

Figure 1:
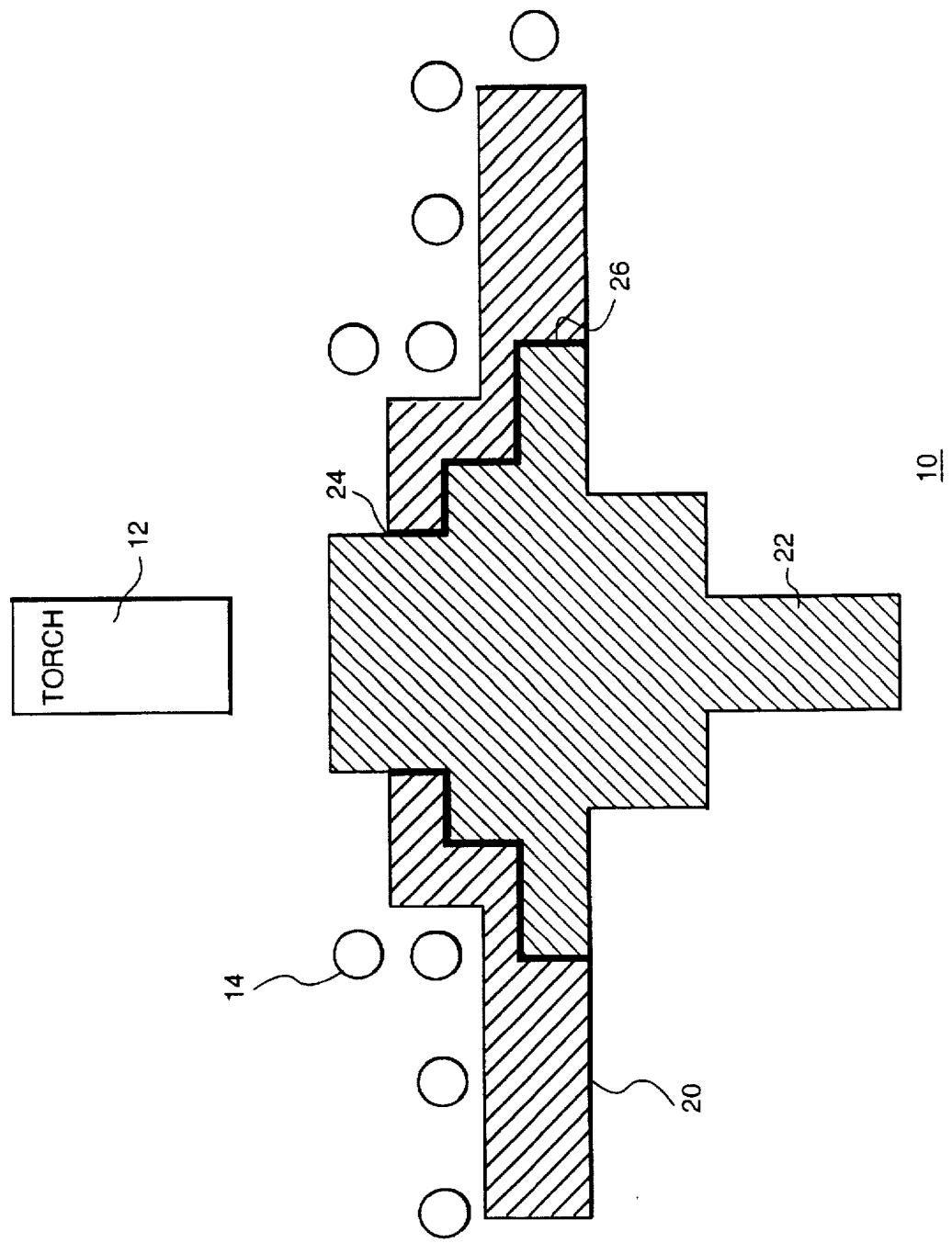
FIG. 1 is a sectional view of apparatus for practicing the brazing method of the present invention.

The present invention comprises imposing an external electromagnetic field during the heating phase of a braze operation for exerting induced electromagnetic forces on the braze alloy in the liquid state to aid the capillary forces. Such enhancement of the molten or liquid braze alloy flow is particularly desirable when large components with complex joints are joined together. When an electromagnetic field of sufficient magnitude is applied, electric currents are induced in the molten braze which will generate forces exceeding gravity and surface tension forces to displace the braze alloy into the nooks and crannies that make up the gap between the two components due to the pressure gradient generated.

This phenomenon is based on the well known principles of Magnetohydrodynamics (MHD) which produces forces on an electrical conducting liquid such as liquid metal. The principle has been used to effectively pump liquid metal in space systems. The application of the electromagnetic field can be used to enhance the liquid braze alloy flow and distribution in narrow channels and corners in both planar and axisymmetric brazing operations.

FIG. 1 discloses an apparatus 10 for practicing the electromagnetic field enhanced brazing method of the present invention. Apparatus 10 comprises a heat source shown in the form of a brazing torch 12 and an external electromagnetic field coil 14. The heat source can be in other forms such as temperature regulated furnace. Coil 14 which is connected to a power source (not shown) produces a low frequency alternating magnetic field. If desired, a coil can be employed to produce a pulsed DC field.

FIG. 1 shows further two adjacent large metallic components to be joined together. One component is a brass hub 20 and the other component is a copper shaft 22. A complex stepped joint 24 is located between adjacent hub 20 and shaft 22. A braze alloy shim or filler 26 of a low melting point silver braze alloy is shown within joint 24.

In the practice of the method of my invention, two metallic components in the form of a hub 20 and a shaft 22 are positioned together thereby forming a joint 24 therebetween The joint 24 is shown as a complex, stepped joint. A brazing alloy shim 26 of a low melting point silver alloy is located within joint 24. This alloy has a nominal composition (%) of 45 Ag, 26 Cu, 21 Zn, 18 Cd and a brazing temperature of 700°–843° C.

A brazing torch 12 heats up the metallic components 20 and 22 and melts brazing alloy shim 26 into a molten or liquid alloy which flows along a stepped path. This type of joint has more resistance to the liquid braze flow than simple straight gap geometries. In many cases, relying only on gravity and capillary forces will not distribute braze alloy and fill the entire joint. External electromagnetic field coils 14 surround components 20 and 22 with molten braze 26 in joint 24 to induce a low frequency alternating magnetic field. When an electromagnetic external field is applied, the induced field in the liquid braze can enhance the gravity and the surface tension forces to cause the braze to flow into the corners needed. This is especially necessary when brazing components that have a large interfacial area. The components are cooled down thereby forming a hub and shaft with a complex braze joint therebetween.

The present brazing method is ideally suited to joining both similar and dissimilar metals. Suitable similar metals include copper, brass, steel, alloy steel and different types of superalloys. Suitable dissimilar metals for joining include copper to brass, steel to alloy steel, and different types of superalloys.

While a wide variety of braze alloys are suitable for joining various metallic components, it is preferred to employ low melting point silver alloys. In particular, low melting point silver alloy brazes identified as BAg braze alloy series −1 to −19 are very useful.

While I have shown the use of a torch to heat the metallic components and to melt the braze alloy shim, other heating means are useful for the practice of my invention. A temperature controlled oven might be employed as the heat source. Two metallic components in the form of a hub 20 and a shaft 22 are positioned together thereby forming a joint 24 therebetween. The joint 24 is shown as a complex, stepped joint. A brazing alloy shim 26 of a low melting point silver alloy is located within joint 24. The temperature of the oven is set to heat components 20 and 22 and melt brazing alloy shim 26 into a molten or liquid alloy which flows along a stepped path. This complex joint has more resistance to the liquid braze flow than simple straight gap geometries. In many cases, relying only on gravity and capillary forces will not distribute braze alloy and fill the entire joint. The heated components with molten braze alloy therebetween are surrounded by external electromagnetic field coils 14 to produce a low frequency alternating magnetic field. When an electromagnetic external field are applied, the induced field can enhance the gravity and the surface tension forces to cause the braze to flow into the corners needed. This is especially necessary when brazing components that have a large interfacial area or complex geometry. The components are cooled down thereby forming a hub and shaft with a complex braze joint therebetween.

While a brazing alloy shim has been shown between the components, a filler rod of braze alloy can be utilized. The filler rod is melted into the joint during the heating step which might employ a brazing torch, oven or other heat source. The other steps of the method are similar.

In an alternate embodiment of the method, an article is formed by positioning together two dissimilar metallic components with complex inner surfaces thereby forming a joint therebetween, providing a brazing alloy shim against the inner surfaces of said components, heating said components thereby melting the brazing alloy shim into a molten alloy braze, applying an electromagnetic field to said molten alloy brazen providing enhanced capillary flow, and cooling down the joined components thereby forming an article.

The foregoing has described an apparatus to practice electromagnetic field enhanced brazing. It will be apparent to those skilled in the art that various modifications thereto can be made without departing from the spirit and scope of the invention as defined in the appended claims.

What is claimed is:

1. A method of brazing metallic components together comprising the steps of:

positioning together said metallic components forming a joint therebetween, providing a brazing alloy for said joint, heating said components thereby melting the brazing alloy, applying an electromagnetic field to exert an induced electromagnetic force on the molten brazing alloy which enhances molten braze flow, and cooling down the joined components.

2. A method according to claim 1 wherein the step of heating further includes employing a brazing torch.

3. A method according to claim 1 wherein the step of heating further includes employing a heating oven.

4. A method according to claim 1 wherein the step of providing further includes employing a brazing alloy shim.

5. A method according to claim 1 wherein the step of providing further includes employing a filler rod.

6. A method according to claim 1 wherein the step of positioning further includes employing a pair of metallic components.

7. A method according to claim 6 wherein the step of positioning further includes employing dissimilar metallic components.

8. A method of braze forming an article comprising the steps of:

positioning together two dissimilar metallic components with complex inner surfaces thereby forming a joint therebetween, providing a brazing alloy shim against the inner surfaces of said components, heating the components thereby melting the brazing alloy shim into a molten alloy braze, applying an electromagnetic field to exert an induced electromagnetic force on said molten alloy braze, which force displaces the molten alloy braze into the joint, and cooling down the joined components thereby forming an article.

* * * * *